US012659692B2

(12) United States Patent
Aslandere et al.

(10) Patent No.: US 12,659,692 B2
(45) Date of Patent: Jun. 16, 2026

(54) CONNECTED SYSTEM FOR TRACKING OF TAGGED OBJECTS

(71) Applicant: FORD GLOBAL TECHNOLOGIES, LLC, Dearborn, MI (US)

(72) Inventors: Turgay Isik Aslandere, Aachen (DE); Marcel Grein, Geilenkirchen (DE); Detlef Kuck, Inden (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 754 days.

(21) Appl. No.: 18/095,259

(22) Filed: Jan. 10, 2023

(65) Prior Publication Data

US 2023/0224675 A1      Jul. 13, 2023

(30) Foreign Application Priority Data

Jan. 11, 2022     (EP) ..................................... 22151019

(51) Int. Cl.
H04W 4/029          (2018.01)
H04W 4/80          (2018.01)

(52) U.S. Cl.
CPC ............. H04W 4/029 (2018.02); H04W 4/80 (2018.02)

(58) Field of Classification Search
CPC ................................ H04W 4/029; H04W 4/80
USPC ....................................................... 455/456.1
See application file for complete search history.

(56) References Cited

U.S. PATENT DOCUMENTS 10,015,654 B2 *    7/2018   Ossin ..................... H04W 4/029
2007/0171431 A1    7/2007   Laflamme 2014/0357295 A1*    12/2014   Skomra ................... G07C 5/008
                                                            455/456.1
2014/0358740 A1    12/2014   Lipsey et al.
2015/0179036 A1    6/2015   Heine et al.
2017/0053234 A1*    2/2017   Lozito ................ G06Q 10/0833
2018/0007504 A1*    1/2018   Kumar ................... G08B 25/10
2018/0127006 A1    5/2018   Wade (Continued)

FOREIGN PATENT DOCUMENTS

DE        102017205306 A1    10/2018
DE        102021128506 A1 *    5/2022    ............ H04W 4/025

(Continued)

OTHER PUBLICATIONS

Devanshi et al. Indoor Localization Based on Bluetooth Technology: A Brief Review. International Journal of Computer Applications vol. 97—No. 8, Jul. 2014. 3 pages.

(Continued)

*Primary Examiner* — Qutbuddin Ghulamali

(74) *Attorney, Agent, or Firm* — Joseph Zane; BROOKS KUSHMAN P.C.

(57)          ABSTRACT

A tracking system for tracking of objects to be transported by at least one transport vehicle is provided. The tracking system includes object sets comprising an object and at least one tagging device with unique identification signal to be permanently sent out and received by a short-range wireless communication unit arrangeable in the transport vehicle. The tracking system further comprises, arrangeable in the transport vehicle, an electronic main controller unit, operatively coupled at least to the short-range wireless communication unit, and a telematics control unit for communicating with a cloud-based computer system.

19 Claims, 5 Drawing Sheets

(56) References Cited

U.S. PATENT DOCUMENTS

| | | |
|---|---|---|
| 2018/0322376 A1 | 11/2018 | Henry et al. |
| 2019/0172352 A1* | 6/2019 | Doyle, III ............... G08G 1/20 |
| 2019/0391634 A1 | 12/2019 | Ayoub |
| 2020/0310399 A1 | 10/2020 | Qi et al. |
| 2021/0076184 A1* | 3/2021 | Lee ....................... H04W 4/029 |
| 2022/0276061 A1* | 9/2022 | Viitala ............... G06Q 10/0833 |
| 2022/0308734 A1* | 9/2022 | Wilkinson ............ G06F 3/0484 |
| 2023/0072489 A1* | 3/2023 | Puppala ................... G01S 5/01 |

FOREIGN PATENT DOCUMENTS

| | | | | |
|---|---|---|---|---|
| EP | 1783570 A1 | 5/2007 | | |
| EP | 2916189 B1 | 5/2019 | | |
| EP | 2974831 B1 | 4/2021 | | |
| EP | 3510802 B1 * | 7/2021 | .............. | H04B 5/20 |
| GB | 2583102 A | 10/2020 | | |
| WO | 2011038018 A1 | 3/2011 | | |
| WO | 2020183345 A1 | 9/2020 | | |

OTHER PUBLICATIONS

Raghavan, Aswin et al. Accurate Mobile Robot Localization in Indoor Environments Using Bluetooth. 2010 IEEE International Conference on Robotics and Automation. Anchorage Convention District. May 3-8, 2010, Anchorage, Alaska. 6 pages.
European Search Report for Application No. 21154248.5 mailed May 26, 2021, 13 pages.

* cited by examiner

CONNECTED SYSTEM FOR TRACKING OF TAGGED OBJECTS

CROSS-REFERENCE TO RELATED APPLICATIONS

This application claims foreign priority benefits under 35 U.S.C. § 119(a)-(d) to EP Application 22 151 019.1 filed Jan. 11, 2022, which is hereby incorporated by reference in its entirety.

TECHNICAL FIELD

The invention relates to a tracking system for tracking of objects to be transported by at least one transport vehicle, and to a method of tracking objects to be transported by at least one transport vehicle, employing at least one such tracking system.

BACKGROUND

In the prior art, various solutions of methods and systems for tracking of objects such as tools are known. As a typical example, tools may be used by professional craftsmen who are supposed to work for a customer or on a construction site to complete an order, and the tools and other auxiliary equipment may be located in a transport van. The known solutions may provide support in preventing loss of tools through forgetfulness, loss or unauthorized removal by alerting users.

For instance, international application WO 2017/197409 A1 proposes a solution for a personal tool loss prevention system and method for persons working at a location remote from a home location. The system comprises a server, a portable tracking device and at least one tracking tag. The server has the ability to store information relating to a vehicle, to a person associated with that vehicle and to tools and equipment associated with that vehicle. The portable tracking device is adapted to be carried or worn by the person when leaving the vehicle. The at least one tracking tag is adapted to be mounted on a tool or equipment used by the person at locations remote from the vehicle. The portable tracking device includes a communication device adapted to connect the tracking device to the server and a receiving device adapted to receive signals from the or each tracking tag. The tracking tag includes a transmitting device adapted to communicate with the tracking device while the tracking tag is within a limited distance of that tracking device. The communication device is adapted to send a signal to the server indicative of whether or not the receiving device of that tracking device is in communication with the tracking tag. The server is adapted to provide an indication when it detects that the tracking tag is not in communication with the tracking device.

The system may include at least two tracking devices, one of which remains on a vehicle and the other is carried by a worker to job sites remote from the truck, multiple tracking tags, and a server, to which the tracking devices are connected via a telecom platform and a tracking application. The server may be a cloud-based server. Each tracking device has cellular, GPS, and Bluetooth components among others. The tracking tags include Bluetooth transmitters and can be attached to tools and equipment. The server communicates with all tracking devices, and manages a list of tracking tags attached to tools and equipment. The list of tracking tags may be edited to reflect the tools and equipment associated with a particular group of tracking devices.

While tools are in the vehicle or storage facility, the first tracking device electronically tethers all tools to itself. When a worker removes a tool from the vehicle and takes it to a jobsite, the second tracking device (the one carried by the worker) electronically tethers that specific tool to itself, essentially handing-off the tool from the first tracking device to the second tracking device automatically and without input or action by any worker. All tracking devices communicate via cellular or other wireless means to the server.

The system does not provide information as to the location of a specific tool, but rather reduces the possibility of loss of tools and equipment by immediately and automatically alerting users that a tool has been forgotten, lost, or stolen, at a time when the tool is still close enough to retrieve easily.

Further in US 2018/322376 A1 is described an asset tag that is adapted to be mounted to an asset such as tools. The asset tag comprises a first component encoded with a first ID unique to the asset tag. The first component has a first wireless interface and is adapted to transmit first broadcast signals via the first wireless interface over a first range. The first broadcast signals include the first ID. The asset tag further includes a user-actuatable button and processing circuitry, which is coupled to the button and to at least the first wireless interface. The processing circuitry is configured for (i) determining whether a predetermined gesture has been performed by a user using the button and (ii) if the predetermined gesture has been performed, transmitting via. the first wireless interface to a wireless access point a restock message, the restock message including the first ID and indicating that restocking is required of assets corresponding to the first ID.

A wireless portable device may be provided comprising a short-range (e.g. NFC) and/or long-range (e.g. Bluetooth) wireless transceiver, a display, an input device and the processing circuitry, coupled to the short-range and/or long-range wireless transceiver, display, and input device. The processing circuitry may be configured for (1) receiving one or more user inputs via the input device, the one or more user inputs identifying an asset, a tag ID being associated in a database with the asset; and (ii) transmitting a search message to a wireless access point, wherein the search message incorporates at least the tag ID.

A proposed asset tracking system for use with the wireless portable device may comprise a wireless access point coupled in a network to a central control computer. The central control computer stores at least a copy of the database, and the database stores, for each tag ID associated therewith, a location ID for a location at which an asset corresponding to the tag ID is stored and/or is available. The wireless access point is configured to receive the search message and to incorporate a location ID of the wireless access point in the search message. The central control computer is configured for (i) receiving the search message, and (ii) querying the database to extract a location ID based on the tag ID.

The short-range (e.g. NFC) wireless transceiver component of the composite tag allows the scanning of the composite tag to record data to a cloud based software. It further allows the booking of a particular asset/tool to a job. E.g. an engineer takes a drill and an angle grinder from several assets on their vehicle. These can be booked to the job, so it records them going on to a particular site. When the engineer gets back to the vehicle he can scan them back onto the vehicle or home store. This gives a record and audit trail of the time specific tools are allocated to a job.

A cloud-based (asset monitoring/tracking) software allows a Bluetooth network of a whole community of community users to track specific assets/tools.

The composite tag placed on an asset can be NFC scanned to tether the asset to a mobile device using Bluetooth short range wireless communication technology. The composite tags of a specific asset can be scanned by another engineer to show an asset/tool transfer from one engineer to another in the cloud-based (asset monitoring/tracking) software. This also automatically tethers the Bluetooth component of the composite tag to the new engineer's smart device. This allows the lending of tools between operatives to be a seamless process.

Moreover, U.S. Pat. No. 9,462,357 B2 proposes an automated system for tracking at least one asset within a physical space through existing cellular network infrastructure, the global positioning system (GPS), WiFi networks, WiMax networks, and the like, and reporting data about the asset location to a user. The system and a method of determining whether a tagged asset is within or without of a stationary or mobile job site are described.

The system comprises an asset tag affixed to each of the plurality of assets, wherein each asset tag comprises a unique identification beacon for the asset with which the asset tag is associated. The asset tag is configured to communicate through one or more transponder antennas to a transponder base having a central processor programmed for filtering data from the plurality of tags to accurately determine the presence or absence of a tag within a predetermined space, wherein the central processor is further programmed to identify tags by asset owner. The transponder base may be wirelessly connected to the Internet via cellular connection or satellite connection to a cloud based server. The transponder base may include GPS location means to track asset tags.

The system further includes a data base for storing asset information for a plurality of assets. The database comprises a list of preselected suggested asset types for a plurality of predetermined task types and is in communication with the central processor. The asset information comprises at least information relating to location, ownership, maintenance and repair of the plurality of assets. The system further comprises tracking software associated with the central processor. The tracking software is configured to track a location of each of the plurality of assets. The software is further configured to compare the list of predetermined suggested asset types with the assets within the predetermined space and communicate any differences between the list and the asset to at least one human readable device. The central processor is in wireless communication with the at least one human readable device and is configured to electronically report information to the device. The information is selected from the group consisting of asset usage, asset location, asset movement, asset ownership, and asset presence within a job site.

Users can be alerted by the proposed system and method about whether tagged assets (such as reclamation tools) have been left behind unintentionally. Tags that should be but are not in contact with transponders are visible to the user. Anyone with access to the system can find this out and, if necessary, take action. The system detects when tags from a finished job are left behind and sends a notification (text message, etc.) to desired parties. The system can provide users with information about where "lost" equipment is located.

One drawback of solutions known in the prior art is that tagged objects can get lost easily when they are not in the coverage area of an active mobile device such as a smartphone or a tablet computer. Another issue is that the tagging devices are usually registered using a unique device ID, e.g. a MAC (media access control) address. They are generally named by the user only later, then indicating the name of the object they are attached to. The existing solutions do not allow to incorporate information about the tagged object into the tagging device. This also makes the tagged objects hard to locate as other active mobile devices can only see with the name or some navigation directions to a tagging device, especially when the tagged objects are lost but in the coverage area of the active mobile device.

SUMMARY

It is an object of the invention to provide a system and a method for tracking tagged objects, which are to be transported by at least one transport vehicle, with an as little as possible tracking issue rate. At the same time, it is a further object of the invention to provide a more intuitive way of representing the tracking of the tagged objects. The tagged objects can in particular be formed by tools for professional craftsmen who work at a customer's site or on a construction site and thus remote from a central workshop.

In one aspect of the invention, the object is achieved by a tracking system with the features of claim 1. The object is further achieved by a distributed tracking system for tracking of objects to be transported by a plurality of transport vehicles with the features of claim 8. The object is furthermore achieved by a method according to claim 9 of tracking objects to be transported by at least one transport vehicle. Further, particularly advantageous embodiments of the invention are disclosed in the respective dependent claims.

It should be noted that the features and measures listed individually in the following description can be combined with one another in any technically meaningful manner and show further embodiments of the invention. The description additionally characterizes and specifies the invention in particular in connection with the figures.

In one aspect of the invention, a tracking system for tracking of objects to be transported by at least one transport vehicle is provided.

The tracking system comprises at least one object set comprising an object and at least one tagging device attached to the object to be tracked. The tagging device includes a short-range wireless communication member that is configured for sending out a unique identification signal. The tracking system further includes a short-range wireless communication unit that is arrangeable in the transport vehicle and that is at least configured to receive the unique identification signals sent out by each short-range wireless communication member, and at least one mobile computing device, which includes at least an optical camera and a LIDAR sensor device.

In the sense of the present invention, the phrase "being configured to", shall be understood as being specifically programmed, laid out, furnished or arranged. The unique identification signal of the at least one tagging device may represent, without being limited to, a MAC (media access control) address.

It is proposed that the tracking system comprises an electronic main controller unit and a telematics control unit, which are arrangeable in the transport vehicle, wherein the electronic main controller unit is operatively coupled at least to the short-range wireless communication unit and the telematics control unit, and the telematics control unit is configured for communicating with a cloud-based computer system.

Further, the at least one mobile computing device comprises short-range wireless communication means for receiving the unique identification signals, and wireless communication means for communicating with the cloud-based computer system.

It is further proposed that the at least one mobile computing device is configured for for each object set, generating a digital visual identifier set at least comprising a scanned image of the at least one object to be transported and digital data representing the unique identification signal of the respective tagging device, communicating the digital visual identifier set to the cloud-based computer system, tracking the unique identification signal of the at least one object set to be transported for receiving real-time location data, and during tracking, communicating the received real-time location data to the cloud-based computer system.

Examples for objects to be transported include, without being limited to, bags, parcels, wallets, personal items, and craftsmen tools in a general meaning, including tools with plug and cordless tools such as fastening tools, saws, hammer drills, chargeable screwdrivers, hammers, but also equipment items and other objects such as portable batteries.

The mobile computing device may be formed by, without being limited to, a mobile phone, a tablet computer, a laptop computer or a wearable device. The short-range wireless communication member of the tagging device may be formed, without being limited to, by a Bluetooth®beacon or may be based on BLE (Bluetooth Low Energy) or WiFi radio standard. The BLE (Bluetooth Low Energy) radio standard has the advantage of being very energy-efficient.

LIDAR (light detection and ranging) sensor devices as devices for measuring distances (ranging) by illuminating an object with laser light and measuring the reflection with a sensor are well known in the art, for instance in applications such as autonomous driving, and need not be described in more detail herein. Further, many mobile computing devices are already equipped with a LIDAR sensor device these days.

Algorithms for detecting nearby Bluetooth devices based on determining respective signal strengths are available in the art and are described, for instance, in the article by Devanshi, Devanshi & Agrawal, Sunil & Singh, Sarvjit, (2014), "*Indoor Localization based on Bluetooth Technology: A Brief Review*", International Journal of Computer Applications, 97, 31-33, 10.5120/17029-7327, and in the article by A. N. Raghavan, H. Ananthapadmanaban, M. S. Sivamurugan and B. Ravindran, "*Accurate mobile robot localization in indoor environments using bluetooth*", 2010 IEEE international Conference on Robotics and Automation, Anchorage, Ak., 2010, pp. 4391-4396, doi: 10.1109/RO-BOT.2010.5509232.

The tagging devices can have their own energy source such as a battery and might use the battery of the transport vehicle for charging. They may be charged, for instance, by employing USB ports. In other embodiments they may be also be charged inductively using a wireless power transfer technology.

Preferably, the wireless communication means of the at least one mobile computing device for communicating with the cloud-based computer system is compatible to at least one mobile telecommunication standard out of GPRS (General Packet Radio Service), EDGE (Enhanced Data Rates for GSM Evolution), UMTS (Universal Mobile Telecommunications System), LTE(-Advanced) (Long-Term Evolution) and 5G.

The proposed tracking system provides all the prerequisites for achieving, when using a suitable method for its operation, an enhanced, i.e. a lower tracking issue rate by making use of the various communication means that allow data access for many remote parties with granted authorization, even globally. Further, the proposed tracking system can provide input data for enhanced visualization for such parties. In appropriate embodiments, the proposed tracking system can provide visualization of objects without their presence, which eases finding lost objects.

The proposed tracking system is primarily designed for land transport vehicles. However, it is also conceived within the scope of the present invention to employ the tracking system in commercial transport shipping vessels for tracking items such as containers, or in a cargo aircraft transporting various kinds of loads.

In the sense of the present invention the term "object" is meant to have a general meaning, and shall include items such as tools with plug and cordless tools such as fastening tools, saws, hammer drills, chargeable screwdrivers, hammers, but also equipment items and other objects such as portable batteries. Further it should be noted, that although in particular tools used by professional craftsmen who are supposed to work at a customer or on a construction site are described in the above and the following, it is to be understood, that the invention could also be used for the parcel delivery sector or in passenger transport vehicle sector for item tracking like the sports bag or the jacket of a user, without being limited to these examples.

In preferred embodiments of the tracking system, the at least one mobile computing device is further configured for visualizing the object or the objects based on data received from the cloud-based computer system. In this way, the at least one mobile computing device can provide augmented reality features to a user for providing a more intuitive way of representing the tracking of the tagged objects.

For example, a 3D representation of a lost object can be visualized on the screen of the mobile computing device together with the camera video stream as background, wherein the 3D visual representation of the lost object is positioned on the location of the tagging device. This is a more intuitive, and more illustrative approach in comparison to conventional tracking employing, for instance, navigation instructions to a tagging device based on Bluetooth signals.

Preferably, the tracking system includes an augmented reality device that is operatively coupleable to the at least one mobile computing device for directly receiving data for visualizing a position of the at least one object. In this way, the intuitive illustration of the tracking of the tagged objects can be enhanced even more in order to make it easier to find them.

Preferably, the digital visual identifier set of at least one object set further comprises at least one out of a mesh representation and a texture mapping of the object to be transported. Adding these features to the digital data representing the unique identification signal of the respective tagging device can help to overcome issues that arise for instance when trying to locate an object that is lost but within a coverage area of the mobile computing device.

Preferably, the at least one mobile computing device is configured to generate the mesh representation and/or perform the texture mapping of the object, for fast signal processing and prevention of faults.

In preferred embodiments of the tracking system, the at least one mobile computing device further comprises short-range communication means and the electronic main controller unit further comprises compatible short-range communication means for direct wireless communication between the at least one mobile computing device and the electronic main controller unit. In this way the at least one mobile computing device can advantageously serve as an intermediate station between the electronic main controller unit of the transport vehicle and the cloud-based computer system. The mobile computing device or the mobile computing devices can connect directly to the electronic main controller unit of the transport vehicle in times when a connection to the cloud-based computer system cannot be established. Also, the electronic main controller unit of the transport vehicle can connect to the mobile device or the mobile devices when a connection to the cloud-based computer system cannot be established.

In some embodiments of the tracking system, the short-range wireless communication means of the at least one mobile computing device that are configured at least for receiving the unique identification signals may be identical to the short-range communication means configured for direct wireless communication between the at least one mobile computing device and the electronic main controller unit. In other embodiments, the short-range wireless communication means for receiving the unique identification signals and the short-range communication means for direct wireless communication with the electronic main controller unit may be distinct units integrated in the at least one mobile computing device.

In preferred embodiments of the tracking system, the telematics control unit is further configured for directly exchanging digital visual identifier sets with the telematics control unit of at least one compatible system for tracking of objects that is partially installed in another transport vehicle. In this way, mutually compatible tracking systems being partially installed in distinct transport vehicles can also communicate directly, besides using a communication path via the cloud-based computer system. This feature enables for tracking all tagging devices nearby a transport vehicle. Considering the potential large number of transport vehicles, especially in cities, a large coverage area can be achieved so that any tagging device can hardly ever be lost together with the object to which it is attached.

Preferably, the at least one tagging device includes an electric energy storage unit, a digital processing unit, a digital data memory unit and a satellite-based radionavigation unit. By that, the real-time location data received by the at least one mobile computing device can be communicated during tracking to the cloud-based computer system in an especially easy manner. The satellite-based radionavigation unit can be formed, for example, by a Global Positioning System (GPS) unit, which is widely spread.

In another aspect of the present invention, a distributed tracking system for tracking of objects to be transported by a plurality of transport vehicles is provided. In the sense of the present invention, the term "plurality" shall in particular be understood as a quantity of at least two. The distributed tracking system includes a plurality of tracking systems in accordance with the present invention. Each tracking system comprises a cloud-based computer system. The cloud-based computer systems of the tracking systems are configured for interchanging data related to digital visual identifier sets and current positions of objects to be transported by the plurality of transport vehicles.

The benefits described beforehand in context with the tracking system in accordance with the present invention apply to the proposed distributed tracking system to the full extent. Moreover, the distributed tracking system has the advantage that all tagging devices that are nearby one of the transport vehicle can be tracked by all others users of one of the transport vehicles, either via communication between the cloud-based computer systems or via communication between the electronic main controller unit of their respective tracking systems.

In yet another aspect of the present invention, a method of tracking objects to be transported by at least one transport vehicle, employing at least one tracking system or a distributed tracking system in accordance with the present invention, is provided.

The method comprises at least the following steps of activating the at least one mobile computing device for generating, for each object set, a digital visual identifier set at least comprising a scanned image of the at least one object to be transported and digital data representing the unique identification signal of the respective tagging device, communicating the digital visual identifier set at least to the cloud-based computer system, tracking the unique identification signal of the at least one object to be transported for receiving real-time location data, and during tracking, communicating the received real-time location data to the cloud-based computer system.

By employing the proposed method, an enhanced, i.e. a lower, tracking issue rate can be achieved by making use of the various communication means that allow data access for many remote parties with granted authorization, even globally. Further, the proposed method can provide enhanced visualization of tagged objects for such parties. In appropriate embodiments, the proposed method can provide visualization of objects without their presence, which eases finding lost objects.

In preferred embodiments, the method further comprises the step of directly exchanging digital visual identifier sets between telematics control units of at least two compatible tracking systems for tracking of objects, wherein the at least two telematics control units are installed in distinct transport vehicles. By that, all tagging devices that are nearby one of the transport vehicle can be tracked by all others users of one of the transport vehicles, either via communication between the cloud-based computer systems or via communication between the telematics control unit of their respective tracking systems.

Preferably, the method further comprises the step of activating the at least one mobile computing device for visualizing the object or the objects based on data received from the cloud-based computer system. By that, the at least one mobile computing device can provide augmented reality features to a user for providing a more intuitive way of representing the tracking of the tagged objects, and a more intuitive, and more illustrative approach of visualization in comparison to conventional methods can be accomplished.

In preferred embodiments, the method further comprises the step of providing data for visualizing a position of the at least one object by an augmented reality device. By that, the intuitive illustration of the tracking of the tagged objects can be enhanced even more in order to make it easier to find them.

These and other aspects of the invention will be apparent from and elucidated with reference to the embodiment or the embodiments and attached drawings described hereinafter, wherein:

DETAILED DESCRIPTION

Figure 1:
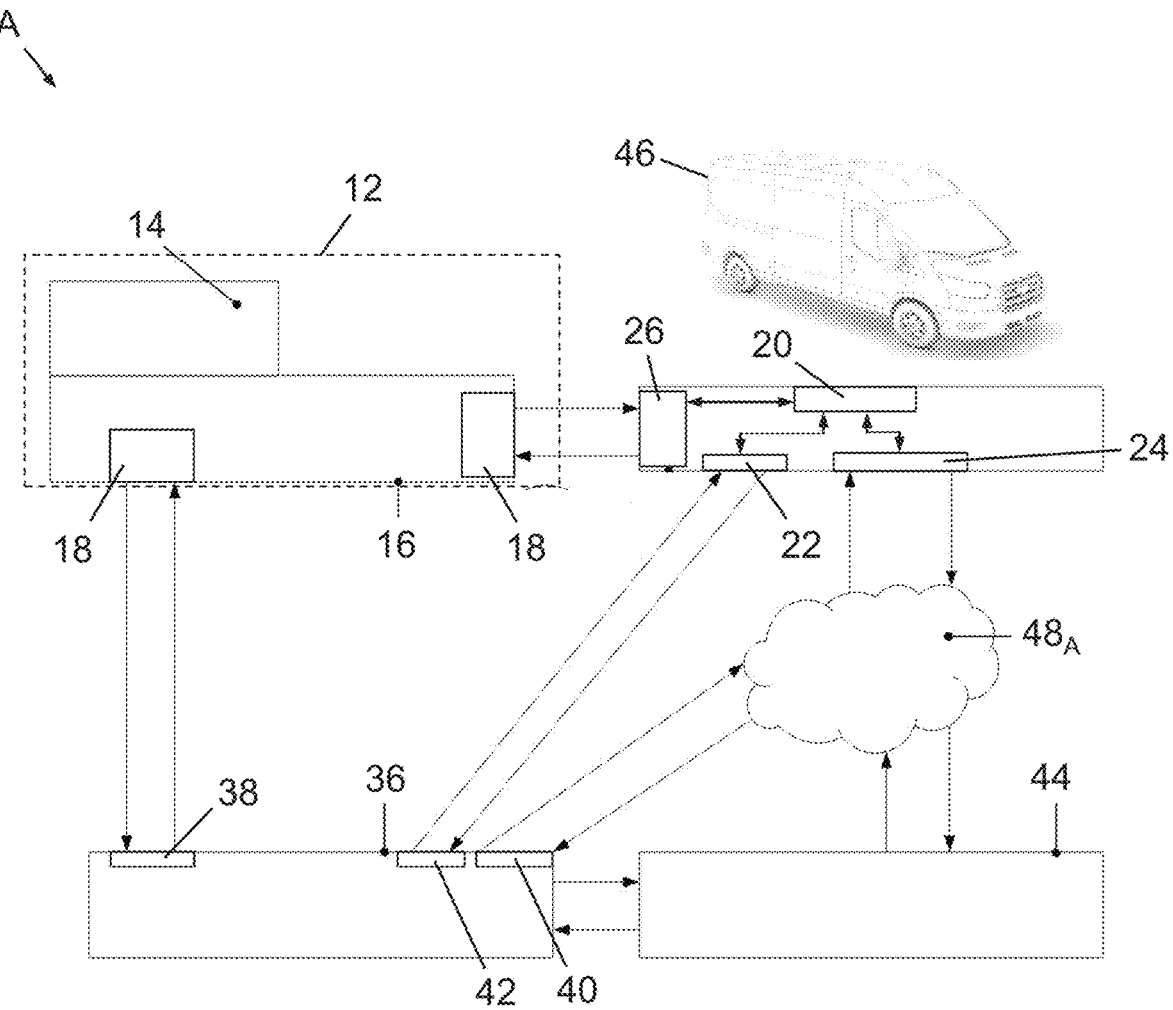
FIG. 1 schematically shows a tracking system in accordance with the invention for tracking of objects to be transported by at least one transport vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the different figures, parts that are the same are always denoted by the same reference numeral, for which reason they are usually described only once.

FIG. 1 schematically shows a tracking system A in accordance with the invention for tracking of objects that are to be transported by a transport vehicle 46, which in this specific embodiment is designed as a van for use by professional craftsmen.

The tracking system A includes a plurality of object sets 12, one of which is exemplarily shown in FIG. 1. Each object set 12 comprises an object 14 and a tagging device 16 that is attached to the object 14 to be tracked. In this specific embodiment the objects 14 can be formed by craftsmen tools and equipment items.

Each tagging device 16 includes a short-range wireless communication member 18 that is configured for sending out a unique identification signal 32 to potential surrounding receivers. In this specific embodiment, the short-range wireless communication member 18 may be formed by an adapted Bluetooth beacon, and the unique identification signal 32 (FIG. 2) may be formed by a MAC address. The short-range wireless communication members 18 (FIG. 1) include an electric energy storage unit, e.g. a battery, a digital processing unit, a digital data memory unit and a satellite-based radionavigation unit (all not shown), which in this specific embodiment may be designed as a UPS unit. The short-range wireless communication members 18 are always in operation until the respective electric energy storage unit runs out of power.

The tracking system A further comprises a short-range wireless communication unit 26 that is arranged in the transport vehicle 46 and that is configured to receive the unique identification signals 32 sent out by the short-range wireless communication member 18 of each tagging device 16.

The tracking system A also includes an electronic main controller unit 20 and a telematics control unit 24, both of which are arranged in the transport vehicle 46. The electronic main controller unit 20 is operatively coupled to the short-range wireless communication unit 26 and the telematics control unit 24, and the telematics control unit 24 is configured for communicating with a cloud-based computer system $48_A$, which also forms part of the tracking system A. The cloud-based computer system $48_A$ is a high-performance computing center offering high computational power and storage capacity, serving both as a storage and processing unit.

Moreover, the tracking system A includes mobile computing devices 36 that in this specific embodiment are designed as a smart phone and a tablet computer. In FIG. 1, only one mobile computing device 36 is exemplarily shown. The mobile computing devices 36 each include an optical camera, a LIDAR sensor device and short-range wireless communication means 38, which may be compatible to the Bluetooth beacon communication standard, for receiving the unique identification signals 32. The mobile computing devices 36 each also comprise wireless communication means 40 for communicating with the cloud-based computer system $48_A$. In this specific embodiment, the wireless communication means 40 for communicating with the cloud-based computer system $48_A$ may be compatible to the LTE (4G) mobile telecommunication standard.

The mobile computing devices 36 further comprise additional components such as a central processing unit (CPU), a graphics processing unit (GPU), an optional artificial intelligence (AI) processing unit, a random access memory (RAM) unit, a digital data memory unit and an electric power unit (all not shown).

Each one of the mobile computing devices 36 further comprises short-range communication means 42, and the electronic main controller unit 20 further comprises compatible short-range communication means 22, for the purpose of direct wireless communication between each one of the mobile computing devices 36 and the electronic main controller unit 20.

In addition, the tracking system A is equipped with an augmented reality device 44 that is operatively coupled to the mobile computing devices 36 for directly receiving data for visualizing a position of a selected object 14. In this specific embodiment, the augmented reality device 44 may be formed by a smartglasses device.

In preparation of tracking a specific object set 12, one of the mobile computing devices 36 is employed by a user to scan an image or images, by using the optical camera and the LIDAR sensor, of the object set 12 to be tracked.

Figure 2:
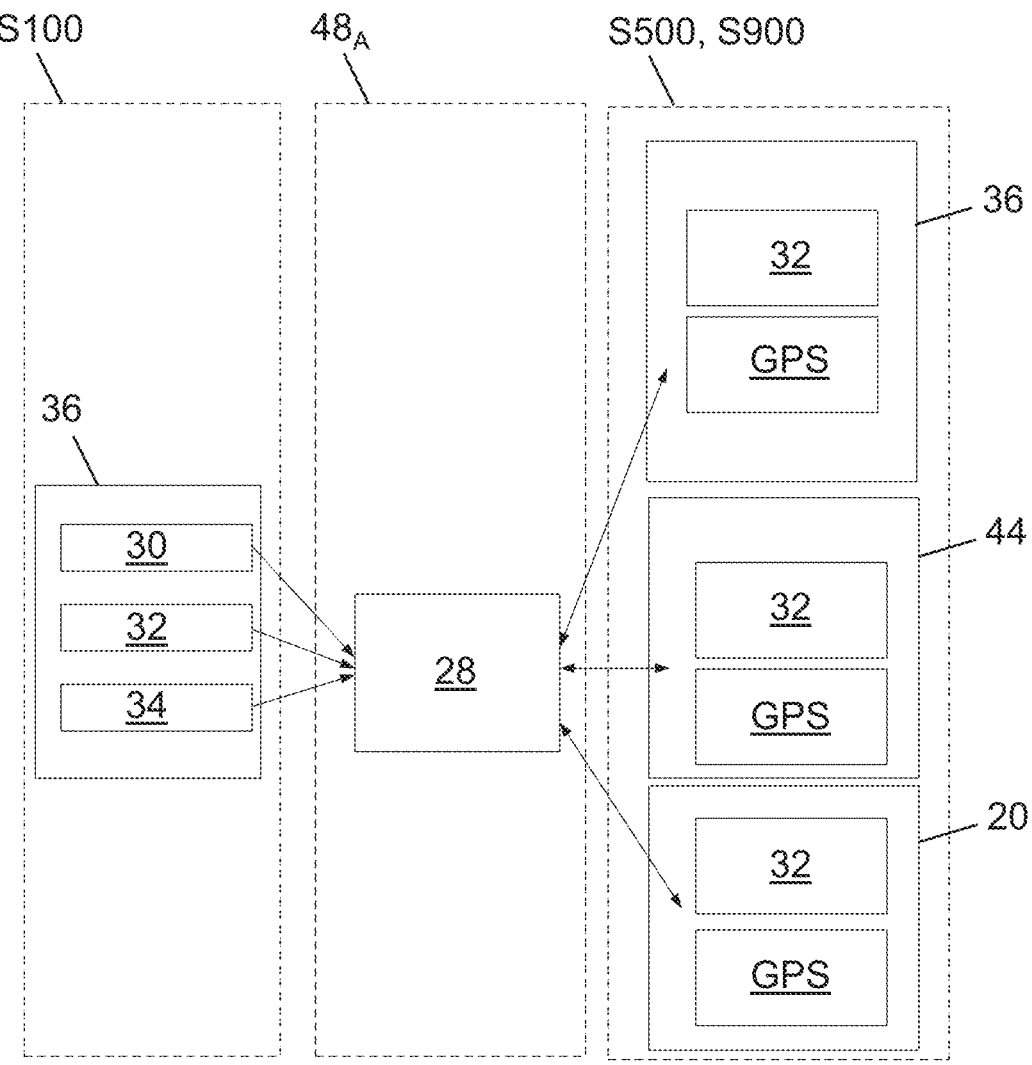
FIG. 2 shows an outline of data flow within the tracking system pursuant to FIG. 1, FIG. 3 schematically shows a distributed tracking system in accordance with the invention for tracking of objects to be transported by a plurality of transport vehicles.

Each one of the mobile computing devices 36 is configured for generating a digital visual identifier set 28 (FIG. 2). The digital visual identifier set 28 comprises the scanned image 30 of the object 14 to be transported and tracked, digital data representing the unique identification signal 32 of the tagging device 16 of the respective object set 12, and a mesh representation and a texture mapping 34 of the object 14 to be transported and tracked.

The tracking system A pursuant to FIG. 1 forms part of a distributed tracking system 10 (FIG. 3) for tracking of objects 14 to be transported by a plurality of transport vehicles 46. The distributed tracking system 10 comprises a plurality of tracking systems A, B, . . . , X that are identically built or compatible to the embodiment of the tracking system A pursuant to FIG. 1, so that each tracking system of the plurality of tracking systems A, B, . . . , X comprises a cloud-based computer system 48$_A$, 48$_B$, 48$_X$. Although each tracking systems A, B, . . . , X is depicted with their own cloud-based computer system 48$_A$, 48$_B$, 48$_X$, it is in the sense of the invention that said tracking systems A, B, . . . , X share the same cloud-based computer system.

Figure 3:
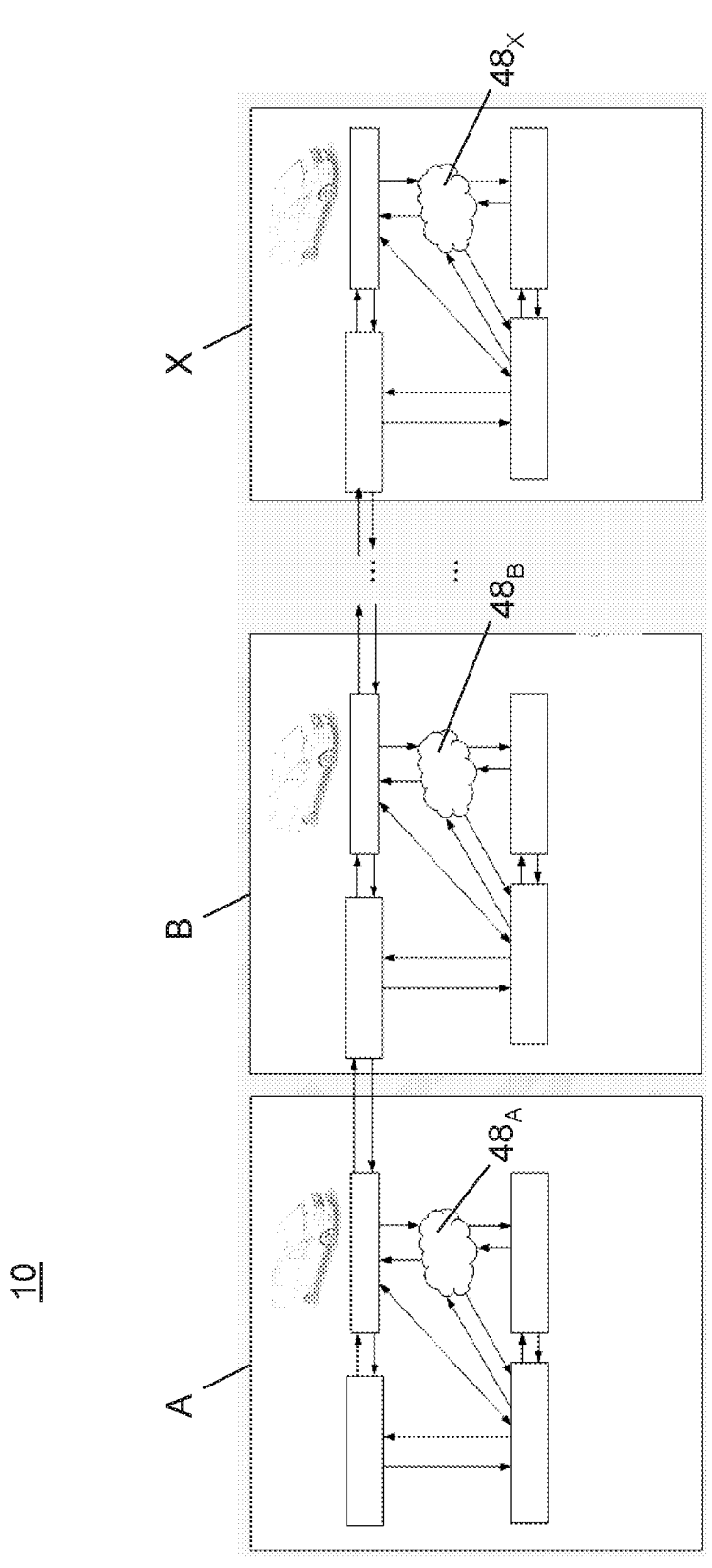
Figure 4:
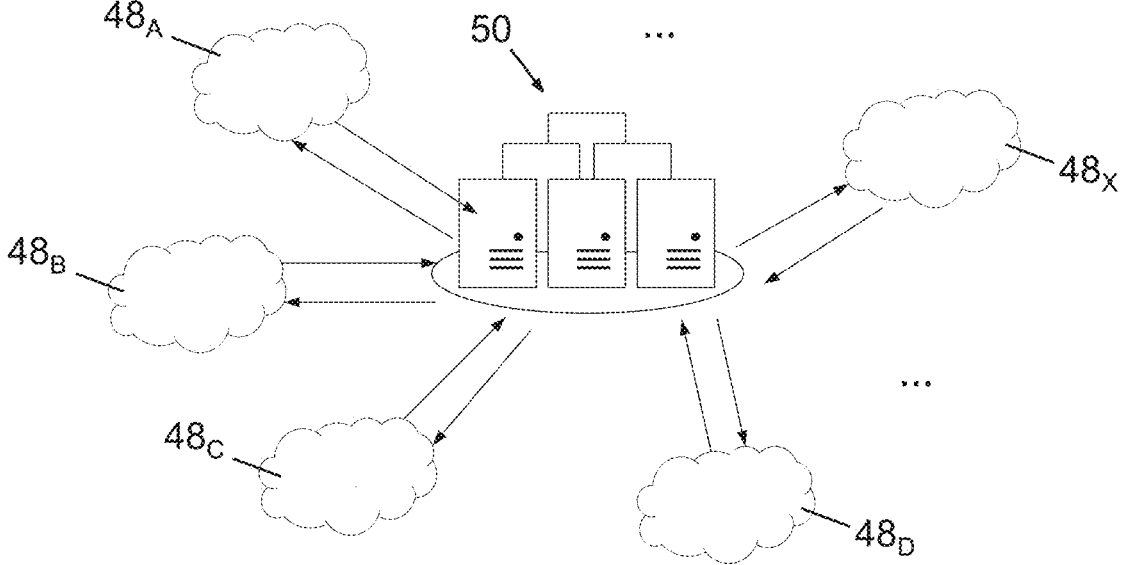
FIG. 4 is a schematic illustration of a cloud-based computer environment of the distributed tracking system pursuant to FIGS. 3.

FIG. 4 is a schematic illustration of a cloud-based computer environment of the distributed tracking system 10 pursuant to FIG. 3. The cloud-based computer systems 48$_A$, 48$_B$, 48$_C$, 48$_D$, 48$_X$ of the plurality of tracking systems A, B, . . . , X are interlinked by a central data center 50, with data access being controlled by granting authorizations. The cloud-based computer systems 48$_A$, 48$_B$, 48$_C$, 48$_D$, 48$_X$ of the plurality of tracking systems A, B, . . . , X are thus configured for interchanging data related to digital visual identifier sets 28 and current positions of objects 14 to be transported by the plurality of transport vehicles 46.

Figure 5:
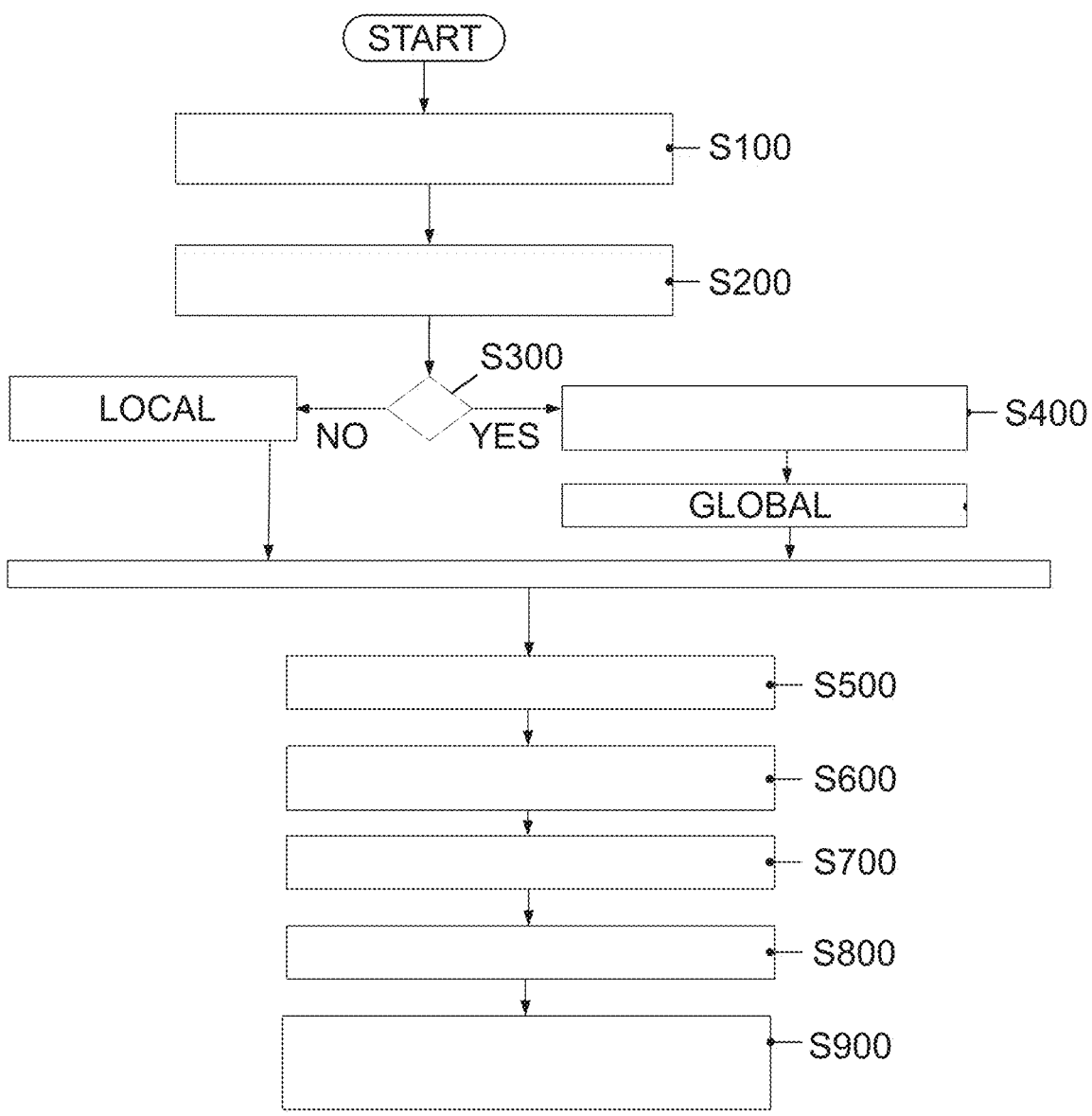
FIG. 5 is a flow chart of a method of tracking objects to be transported by at least one transport vehicle, employing the tracking system pursuant to FIG. 1.

In the following, a possible embodiment of a method of tracking objects 14 to be transported by the transport vehicle 46, employing the tracking system A pursuant to FIG. 1, will be described with reference to FIG. 1, to FIG. 2, which shows an outline of data flow within the tracking system A pursuant to FIG. 1, and to FIG. 5, by which a flowchart of the method is provided. In preparation of executing the method steps it is understood that all involved units and devices are in an operational state.

After the start of the method, one of the mobile computing devices 36 is activated in one step S100 for generating the digital visual identifier set 28 of the object 14 to be transported and tracked. It is understood that this step S100 is carried out for each of the objects 14 to be transported and tracked and for each newly added object 14 to be transported and tracked.

In a further step S200 the digital visual identifier set 28 is communicated to the cloud-based computer system 48$_A$ by one of the mobile computing devices 36. At a prompt step S300, the user can decide to deny or allow global sharing of the digital visual identifier set 28. If global sharing is denied, the tagging device 16 of the object set 12 is tracked only locally.

If global sharing is allowed, the cloud-based computer system 48A of the tracking system A shares the digital visual identifier set 28 with the central data center 50 in another step S400. The real-time location data GPS are then available in the central data center 50 for all remote parties with granted authorization. The tagging device 16 of the object set 12 can be tracked globally.

In another step S500, the user activates one of the mobile computing devices 36 for tracking the tagging device 16. In the following, the digital visual identifier set 28 of the object set 12 to be transported is tracked for receiving real-time location data in a next step S600.

During tracking, the received real-time location data are communicated by the activated mobile computing device 36 to the cloud-based computer system 48A in a further step S700. By that, the data are shared with all remote parties with granted authorization for data access.

The position of the tagging device 16 of the object set 12 to be transported is made available in the cloud-based computer system 48A in another step S800.

In another step 900, one of the mobile computing devices 36 of the tracking system A is activated for visualizing the object 14 or the objects 14 based on the received real-time location data, or a mobile computing device 36 of one of the other tracking systems B, . . . , X of the distributed tracking system 10 is activated for visualizing the object 14 or the objects 14 based on data received from the cloud-based computer system 48A or the central data center 50. On the screen of the respective activated mobile computing device 36, a 3D representation of the object 14 or the objects 14 is visualized together with the camera video stream as background.

Alternatively or in addition, the step 900 may include providing data for visualizing a position of the object 14 or the objects 14 by the augmented reality device 44, i.e. the smartglassess device.

It is noted that another option exists for sharing the real-time location data of the tagging devices 16 in or nearby the transport vehicle 46 in case that another one of the tracking systems B, . . . , X of the distributed tracking system 10 is close enough to let the ranges of the telematics control units 24 of the two tracking systems overlap (FIG. 3).

The telematics control unit 24 is configured for directly exchanging digital visual identifier sets 28 with the telematics control units 24 of compatible systems for tracking of objects 14 that are partially installed in other transport vehicles 46, as is schematically indicated in FIG. 3.

The proposed tracking system and method allow for tracking tagging devices globally when mobile devices, vehicles, and/or smart glasses are nearby. The tracking system also allows to visualize the objects which the tagging devices attached to them, without the presence of the object.

While the invention has been illustrated and described in detail in the drawings and foregoing description, such illustration and description are to be considered illustrative or exemplary and not restrictive. The invention is not limited to the disclosed embodiments.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tracking system for tracking of objects to be transported by at least one transport vehicle, the tracking system including:

at least one object set comprising an object and at least one tagging device attached to the object to be tracked, the tagging device including a short-range wireless communication member that is configured for sending out a unique identification signal;

a short-range wireless communication unit that is arrangeable in the transport vehicle and that is at least configured to receive the unique identification signals sent out by each short-range wireless communication member;

at least one mobile computing device, including an optical camera, a LIDAR sensor device, a short-range wireless communication means for receiving the unique identification signals, and wireless communication means for communicating with a cloud-based computer system; and an electronic main controller unit and a telematics control unit, which are arrangeable in the transport vehicle, wherein the electronic main controller unit is operatively coupled at least to the short-range wireless communication unit and the telematics control unit, and the telematics control unit is configured for communicating with the cloud-based computer system, wherein the at least one mobile computing device is configured to for each object set, generate a digital visual identifier set at least comprising a scanned image of the at least one object to be transported captured using the optical camera and the LIDAR sensor device and digital data representing the unique identification signal of the respective tagging device, communicate the digital visual identifier set to the cloud-based computer system, track the unique identification signal of the at least one object set to be transported for receiving real-time location data, and during tracking, communicate the received real-time location data to the cloud-based computer system.

2. The tracking system of claim 1, wherein the at least one mobile computing device is further configured for visualizing the object or the objects based on data received from the cloud-based computer system.

3. The tracking system of claim 1, further comprising an augmented reality device that is operatively coupleable to the at least one mobile computing device to directly receive data for visualizing a position of the at least one object.

4. The tracking system of claim 1, wherein the digital visual identifier set of at least one object set further comprises at least one of a mesh representation or a texture mapping of the object to be transported.

5. The tracking system of claim 1, wherein the at least one mobile computing device further comprises short-range communication means and the electronic main controller unit further comprises compatible short-range communication means for direct wireless communication between the at least one mobile computing device and the electronic main controller unit.

6. The tracking system of claim 1, wherein the telematics control unit is further configured for directly exchanging digital visual identifier sets with the telematics control unit of at least one compatible system for tracking of objects that is partially installed in another transport vehicle.

7. The tracking system of claim 1, wherein the at least one tagging device includes an electric energy storage unit, a digital processing unit, a digital data memory unit and a satellite-based radionavigation unit.

8. A distributed tracking system for tracking of objects to be transported by a plurality of transport vehicles, comprising:

a plurality of tracking systems, wherein each tracking system comprises a cloud-based computer system, the cloud-based computer systems of the tracking systems being configured for interchanging data related to digital visual identifier sets and current positions of objects to be transported by the plurality of transport vehicles, wherein each digital visual identifier set includes a scanned image of a respective object to be transported generated based on data captured using an optical camera and a LIDAR sensor device, and digital data representing a unique identification signal of a tagging device attached to the respective object.

9. The distributed tracking system of claim 8, wherein each of the plurality of tracking systems comprises:

at least one object set comprising an object and at least one tagging device attached to the object to be tracked, the tagging device including a short-range wireless communication member that is configured for sending out a unique identification signal;

a short-range wireless communication unit that is arrangeable in the transport vehicle and that is at least configured to receive the unique identification signals sent out by each short-range wireless communication member; and at least one mobile computing device, including an optical camera and a LIDAR sensor device, the at least one mobile computing device comprising an electronic main controller unit and a telematics control unit, which are arrangeable in the transport vehicle, wherein the electronic main controller unit is operatively coupled at least to the short-range wireless communication unit and the telematics control unit, and the telematics control unit is configured for communicating with a cloud-based computer system, wherein the at least one mobile computing device comprises short-range wireless communication means for receiving the unique identification signals, and wireless communication means for communicating with the cloud-based computer system, and wherein the at least one mobile computing device is configured to for each object set, generate a digital visual identifier set at least comprising a scanned image of the at least one object to be transported and digital data representing the unique identification signal of the respective tagging device, communicate the digital visual identifier set to the cloud-based computer system, track the unique identification signal of the at least one object set to be transported for receiving real-time location data, and during tracking, communicate the received real-time location data to the cloud-based computer system.

10. The distributed tracking system of claim 9, wherein the at least one mobile computing device is further configured for visualizing the object or the objects based on data received from the cloud-based computer system.

11. The distributed tracking system of claim 9, further comprising an augmented reality device that is operatively coupleable to the at least one mobile computing device to directly receive data for visualizing a position of the at least one object.

12. The distributed tracking system of claim 9, wherein the digital visual identifier set of at least one object set further comprises at least one of a mesh representation or a texture mapping of the object to be transported.

13. The distributed tracking system of claim 9, wherein the at least one mobile computing device further comprises short-range communication means and the electronic main controller unit further comprises compatible short-range communication means for direct wireless communication between the at least one mobile computing device and the electronic main controller unit.

14. The distributed tracking system of claim 9, wherein the telematics control unit is further configured for directly exchanging digital visual identifier sets with the telematics control unit of at least one compatible system for tracking of objects that is partially installed in another transport vehicle.

15. The distributed tracking system of claim 9, wherein the at least one tagging device includes an electric energy storage unit, a digital processing unit, a digital data memory unit and a satellite-based radionavigation unit.

16. A method of tracking objects to be transported by at least one transport vehicle, comprising:

activating at least one mobile computing device including an optical camera and a LIDAR sensor device for generating, for each object set, a digital visual identifier set at least comprising a scanned image of at least one object to be transported generated based on data captured using the optical camera and the LIDAR sensor device and digital data representing a unique identification signal of a respective tagging device;

communicating the digital visual identifier set at least to a cloud-based computer system;

tracking the unique identification signal of the at least one object to be transported for receiving real-time location data; and during tracking, communicating the received real-time location data to the cloud- based computer system.

17. The method of claim 16, further comprising directly exchanging digital visual identifier sets between telematics control units of at least two compatible tracking systems of a plurality of tracking systems for tracking of objects, wherein at least two telematics control units are installed in respective distinct transport vehicles.

18. The method of claim 16, further comprising activating the at least one mobile computing device for visualizing the object or the objects based on data received from the cloud-based computer system.

19. The method of claim 16, further comprising providing data for visualizing a position of the at least one object by an augmented reality device.

* * * * *